(12) United States Patent
Baron

(10) Patent No.: US 6,963,365 B2
(45) Date of Patent: Nov. 8, 2005

(54) SYSTEM AND METHOD FOR REMOVAL OF DIGITAL IMAGE VERTICAL DISTORTION

(75) Inventor: John M. Baron, Longmont, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 814 days.

(21) Appl. No.: 09/795,598

(22) Filed: Feb. 28, 2001

(65) Prior Publication Data

US 2002/0118292 A1 Aug. 29, 2002

(51) Int. Cl.$^7$ .............................................. H04N 5/262
(52) U.S. Cl. ........................................ 348/239; 345/647
(58) Field of Search ........................... 345/647; 348/239

(56) References Cited

U.S. PATENT DOCUMENTS

| | | | | |
|---|---|---|---|---|
| 5,561,723 A | * | 10/1996 | DesJardins et al. | 348/578 |
| 6,108,032 A | * | 8/2000 | Hoagland | 348/144 |
| 6,449,004 B1 | * | 9/2002 | Okisu et al. | 348/239 |
| 6,563,532 B1 | * | 5/2003 | Strub et al. | 348/158 |

OTHER PUBLICATIONS

Breeze, Chris. "Digital Correction of Converging Verticles." http://photocritique.net/articles/converging/converging-.html. pp. 1–2.

McCann, Richard. "Perspective control (Shift Lenses) in Architectural Photography." http://www.photostuff.co.uk/shftIns.htm. pp. 1–7.

Ames, David. "A Primer on Architectural Photography and the Photo Documentation of Historic Structures." http://www.vernaculararchitecture.org/Features/Photography/article.htm. pp. 1–8.

Ollinger, J. A. "A Beginner's Guide to Large Format." http://www.speedlink.com/jao/photo/viewcam.htm. pp. 1–5.

Sheeran, Frank. "How Shift Lenses change your Life." http://www.photo/canon/tili–shift.html. (1997) pp. 1–6.

* cited by examiner

Primary Examiner—Wendy R. Garber
Assistant Examiner—Jason Whipkey

(57) ABSTRACT

A device, preferably a digital camera, has an imaging sensor providing a digital representation of an image projected onto an imaging portion of the imaging sensor. A processor associated with the device identifies an image compression factor and progressively, over a selected region of the digital representation of the image, magnifies at least a portion of the digital representation of the image to reduce an apparent convergence distortion. Correction preferably occurs before lossy compression. The device preferably includes a display to provide a visual display of the digital representation of the image to a user who may use a user input to manually correct apparent distortion by following prompts generated on the display. The device also preferably includes a non-volatile memory configured to store the digital representation of the image.

14 Claims, 3 Drawing Sheets

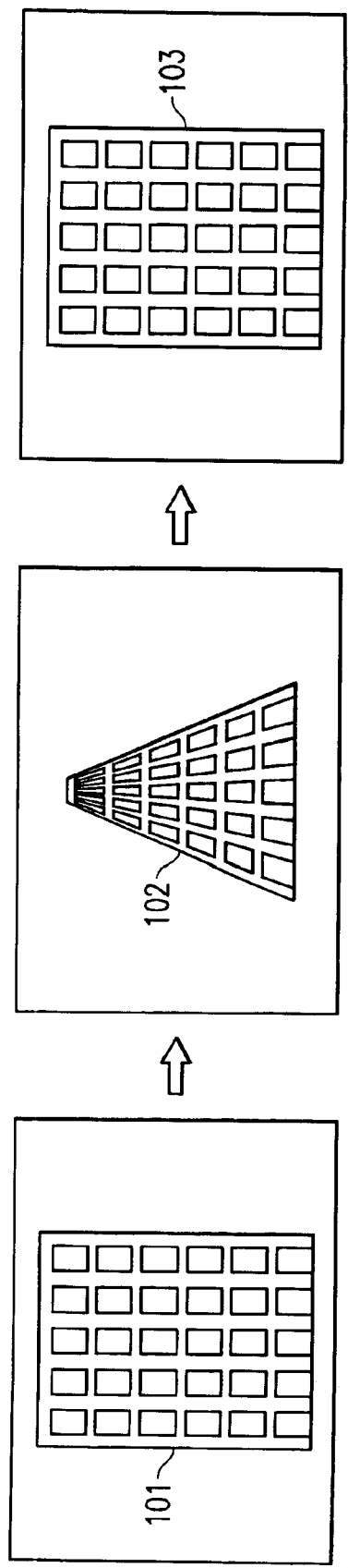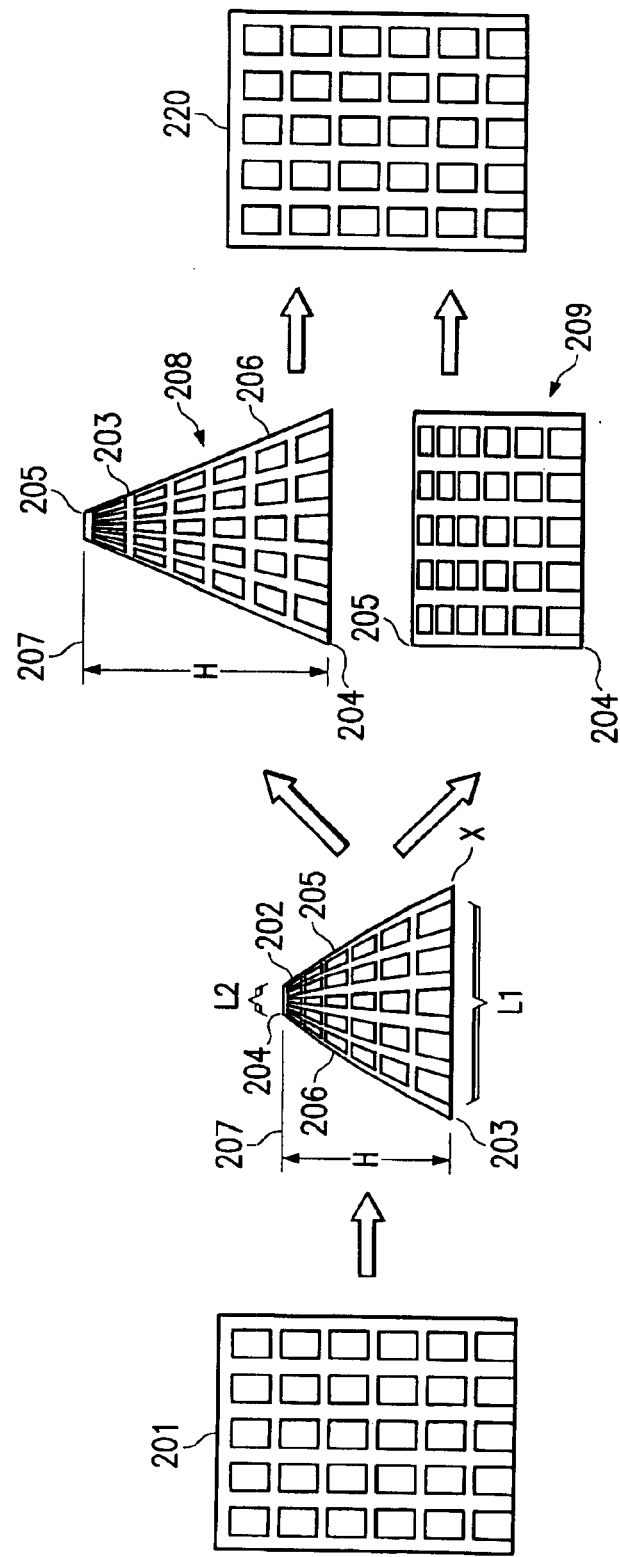

SYSTEM AND METHOD FOR REMOVAL OF DIGITAL IMAGE VERTICAL DISTORTION

TECHNICAL FIELD

The present invention relates to digital imaging. More particularly, the present invention relates to the correction of converging verticals in optical images.

BACKGROUND

A common problem encountered in architectural photography that is present when taking pictures of buildings is that of converging verticals resulting in a distorted image of the building. Converging verticals occurs when the plane of the object to be photographed is not parallel with the plane of the film in the back of the camera. The problem of converging verticals is particularly acute when a photographer is using a wide angle lens and looking up at a building in an effort to capture an image of the entire building.

The prior art has devised several methods of combating the problem of vertical distortion. For example, when using a 35 mm camera, one technique for correcting vertical distortion is through the use of a tilt and shift lens when the picture is taken. As will be appreciated by one of ordinary skill in the art, a major drawback with the use of a tilt and shift lens lies in its expense; the cost of a tilt and shift lens is prohibitive for most amateur photographers. Another drawback with the use of a tilt and shift lens is that such lenses are only really suitable for use in architectural photography and difficult to use in any event.

Another common solution to avoid converging vertical distortion is the use of a view camera in which the lense is mounted on a lens board which is attached to a rear film back with a flexible bellows. Rather than tilting the camera and film back to frame a desired architectural subject, the photographer maintains the film back parallel to the plane of the architectural subject, e.g., the front of the building to be photographed. The image is then framed within the film area by translating or shifting the film back into the desired portion of the image circle projected by the lens. The flexible, light tight bellows allows independent movement of the lens board and film back to support these adjustments.

The prior art has also attempted to correct the problem of converging verticals after the photograph has been taken. Some prior artisans attempt to correct converging verticals while developing the film by tilting the enlarger's head or tilting the printing easel. These techniques suffer from several drawbacks. For example, tilting the enlarger head accurately enough to correct the convergence, or controlling the tilt of the easel, is extremely difficult in dim light when developing black and white photographs and nearly impossible in complete darkness when developing color photographs. In addition, tilting the enlarger head or easel means that one edge of the photograph paper is going to be closer than the other which may cause focusing problems. Likewise, when one edge of the paper is closer to the enlarger than the other, that edge receives more light and may become over exposed.

Other artisans have attempted to correct a photograph's perspective using digital techniques. A variety of software packages which have some sort of "distortion" tool which can map a rectangular area to an arbitrary quadrilateral may be used to attempt to correct converging verticals. A description of digital correction using a variety of software packages is set forth at http://photocritique.net/articles/converging/converging.html (visited Oct. 26, 2000).

Drawbacks of using commercial software packages to perform digital compression are numerous. For example, using commercial software requires a user to have a computer system capable of running the software and requires the photographs to be fully developed and then input into the computer system by means of a scanner which provides the system with a digital representation of the photograph. These components can be prohibitively expensive. In addition, attempting to digitally correct for converging verticals after the photograph has been developed and scanned into a computer system for editing (and then saving the corrected image) can result in loss of detail. Alternatively, while digital cameras may provide a digitized image directly, such images are often stored using a lossy compression algorithm so that later image manipulation produces undesirable image artifacts.

The foregoing underscores some of the problems and limitations associated with correcting converging verticals in optical images.

SUMMARY OF THE INVENTION

The present invention encompasses a system and method for digitally correcting converging verticals in optical images. More particularly, the present invention relates to digital imaging devices capable of identifying an image compression factor (i.e., a one or two dimensional factor or function describing the amount of convergence with respect to image location) and using it to reduce apparent convergence distortion, and also relates to digital cameras capable of compensating for distortion of an optical image to be captured.

According to one aspect of the invention, a digital camera is preferably adapted to compensate for distortion of an optical image. The digital camera may include an optical lens system providing an optical image, an image sensor providing a digital representation of the optical image, and a processor configured to selectively process the digital representation of the optical image to compensate for a distortion of the optical image.

In accordance with another aspect of the invention, the processor of the digital camera preferably is configured to apply a varying magnification factor to the digital representation of the optical image along a first axis with respect to a second axis or diagonal to said first axis. In accordance with this aspect of the invention, the first and second axes correspond to a plane defined by an imaging surface of the image sensor on which the optical image is formed by the optical lens system.

In accordance with another aspect of the invention, the digital camera preferably further comprises an input device configured to provide manual control of the magnification factor. In accordance with this aspect of the invention, the input device may be further configured to provide manual positioning of the axes about which magnification correction is measured and applied.

In accordance with another aspect of the invention, the digital camera preferably further comprises a display responsive to the digital representation to display an optical image as processed by the processor.

In accordance with another aspect of the invention, there is preferably provided the digital cameras as described above, wherein the camera processor is configured to apply a variable aspect ratio to the optical image to compensate for a linear convergence distortion of the optical image as formed on the image sensor by the lens system. In accordance with this aspect of the invention, the processor may be configured to compensate for the linear distortion wherein the linear distortion is caused by an orientation of an imaging surface of the optical sensor with respect to a subject corresponding to at least a portion of said optical image.

In accordance with another aspect of the invention, there is provided the digital cameras as described above, wherein the digital cameras preferably further comprise a storage media for storing the digital representation of the optical image.

In accordance with another aspect of the invention, there is provided the digital camera as described above, wherein the digital camera preferably further comprises a display responsive to the digital representation to display the optical image as processed by the processor. It is another aspect of the present invention to provide a digital camera as described above, wherein the processor is preferably configured to determine a linear distortion value relative to a base line, and to progressively magnify (in one or two-dimensions) the digital representation so as to reduce apparent linear convergence. In accordance with this aspect of the invention, the processor may be configured to determine the linear distortion value in response to identification of an offset from vertical of a line segment identified in the optical image. Also, in accordance with this aspect of the invention, the processor may be configured to determine the linear distortion value in response to identification of a difference in length between two line segments identified in the optical image.

It is another aspect of the invention to preferably provide a digital imaging device comprising an imaging sensor providing a digital representation of an image projected onto an imaging portion of the imaging sensor. An optical lens system is configured to form an image of a subject onto said imaging portion. A processor identifies an image spatial compression factor and progressively, over a selected linear region of the digital representation of said image, magnifies at least a portion of the digital representation of the image to reduce an apparent convergence distortion. In accordance with this aspect of the invention, the device may include a camera body, wherein the imaging sensor, optical sensor, and processor are mounted therein; a display is mounted to the camera and configured to provide a visual display of the digital representation of said image, and a non-volatile memory configured to store the digital representation of said image. In one aspect of the invention, the processor is configured to compress, using a lossy image compression technique, the digital representation of the image to provide and store compressed image data.

BRIEF DESCRIPTION OF THE DRAWING

FIG. 1 shows a subject building; an image of the building exhibiting vertical convergence distortion, and a digitally corrected image;

FIG. 2 shows a subject building and its distorted image as formed on the CCD of a digital camera and a more detailed depiction of two alternative correction paths; namely wherein the distorted image is adjusted first in the vertical direction and secondly the horizontal, or wherein the distorted image is corrected first in the horizontal direction and then in the vertical direction;

DETAILED DESCRIPTION

Figure 3:
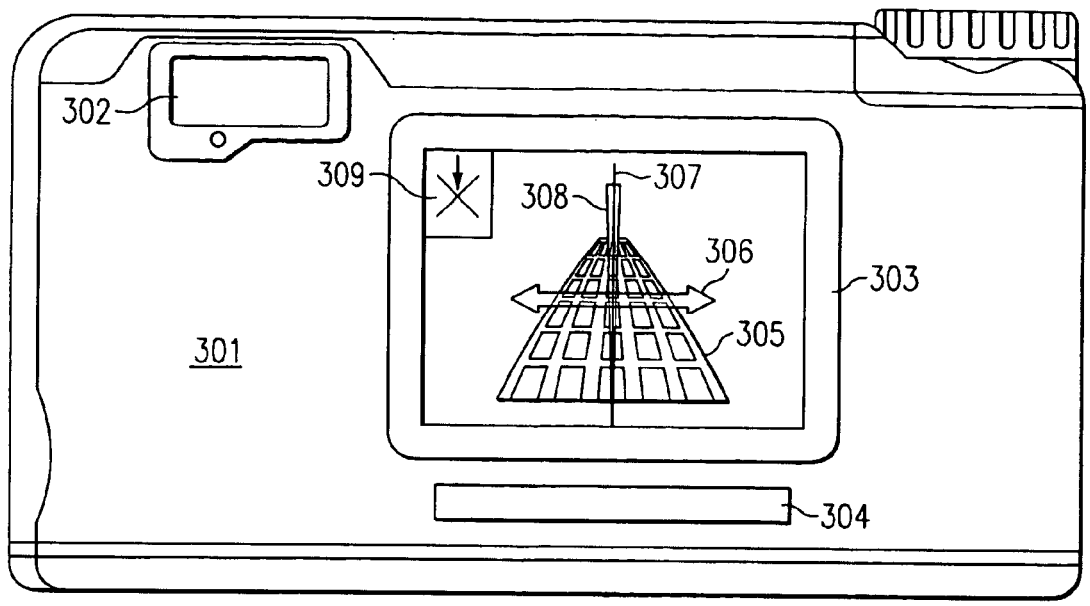
FIG. 3 is a plan view of a digital camera having an LCD display depicting a constructed image and aids to help a user to compensate for the distortion according to the invention.

Generally, the present invention relates to devices and methods for the digital correction of converging verticals.

The device may correct distortion after lossy compression, or preferably, before lossy compression. The device may be a stand-alone device, a PC computer software application, or integral with another device, such as a camera. Although the device will be embodied herein as part of a digital camera, the invention should not be viewed as limited to digital cameras and can be used with both still and "moving" pictures.

As depicted in FIG. 1, a subject to be captured by an imaging device, such as subject building 101, may be generally rectangular in shape and appearance. To the human eye, the building's image will appear rectangular, with the possible exception of some convergence of vertical lineage based on distance effects which are not adjusted for by human cognitive perception of size constancy.

The building's image may be captured by an optical device. As will be appreciated by one of ordinary skill in the art, a viewer attempting to capture the image with an imaging device such as a camera at ground level typically has to tilt the device upward to capture upper portions of building 101 in the device's field of view. This tilting of the device results in distorted image 102 of building 101 being formed on the device's imaging surface.

Distorted image 102 of building 101 is characterized by a quadralinear, trapezoidal, appearance exhibiting progressive compression, or convergence, in the vertical and to a lesser extent, horizontal directions. This distortion is often referred to as "converging verticals." As used herein, "converging verticals" is meant to describe the phenomena wherein parallel lines do not appear parallel. Usually, such lines appear to converge, but under some situations, could appear to diverge.

As will be appreciated by one of ordinary skill in the art, this optical phenomena is the sum of two visual or optical effects. The first is caused by the imaging surface of an optical device (such as the film plane of a camera or the CCD image sensor of a digital camera) not being parallel to the plane of the subject object being projected onto the imaging surface, thereby resulting in an image appearing to converge at a rate proportional to the tilt of the imaging surface.

The second effect is due to the use of lenses in capturing images. For example, the human eye uses a lens to focus images. The distortion of large objects, such as tall buildings, is part of the natural vanishing point of vision. For example, to an observer, railroad tracks appear to converge on the horizon. Such convergence is not a distortion of an image, as it represents the fact that objects which are closer appear larger while objects at a distance appear smaller to an observer. The same holds true for cameras, binoculars, telescopes and like devices using lenses to focus images. However, this effect will be considered to contribute to the phenomena of "converging verticals." Certain of the columns of the Parthenon (particularly the end columns) are said to have purposefully tilted so that when viewed from a distance, the building would not appear to be collapsing due to the "converging vertical" operation of the human eye.

Distorted image 102 has the distortion effects of converging verticals compensated for by using the device and methods of the present invention set forth herein to generate corrected image 103.

As shown in FIG. 2, there are two alternate ways to correct compression distortion in the horizontal and vertical directions caused by the "converging verticals" phenomena. Subject building 201 in FIG. 2 is much taller than building 101 of FIG. 1 and the imaging device is much closer to the base of the building than in FIG. 1. Accordingly, the tilt of the imaging surface's plane relative to the plane of subject building 201 is much more dramatic, and results in exceptionally distorted image 202.

Exceptionally distorted image 202 is characterized by sharply converging vertical lines and an apparent, drastic compression in height. Image 202 has height 207 represented herein as "H," and base width 203, or reference width, having length of L1 and compressed top width 204 having length of L2. Image 202 also has first and second converging vertical lines 205, 206 each of length "X."

In a first method of correcting distortion, the correction in the vertical or height wise direction is performed first to get intermediate vertically expanded image 208; wherein vertical magnification is determined by formula:

Magnification=$(X/H)(L1/L2-1)+1$

After vertical magnification, intermediate image 208 is horizontally magnified by expanding length L2, or top width (in all points in between and a decreasingly progressive and proportional manner) until L1 equals L2, to get corrected image 220.

In a second method, horizontal magnification is performed first. Image 202 is expanded in a proportional and progressive manner until L2 equals L1; wherein L1 is used as a reference (1× mag) area of expansion to get intermediate horizontally expanded image 209. Intermediate horizontally expanded image 209 is then vertically magnified from the base to the top in a progressive and proportional manner wherein the magnification value is equivalent to the magnification in the horizontal direction to get corrected image 220.

FIG. 3 depicts a device for correcting converging verticals in accordance with the invention as it might be embodied in digital camera 300. Digital camera 300 has camera back 301. Disposed on camera back 301 is optical view finder 302 which a user uses to preview an image of an object to be captured. Also disposed on camera back 301 is LCD panel 303. Although this embodiment uses an LCD display, one of ordinary skill in the art will appreciate that any visual display may be used in accordance with the invention. In a presently preferred embodiment, the LCD display is a navigable display as set forth and described in applicant's co-pending U.S. application Ser. No. 09/765,172, filed Jan. 18, 2001, entitled "NAVIGABLE CAMERA BACK DISPLAY," which is hereby incorporated herein by reference in its entirety. Associated with LCD panel 303 on camera back 301 is command key 304 which a user may use to input commands for image correction as described herein.

As depicted in FIG. 3, distorted image 305 of a subject is displayed. Display 303 also projects magnification direction indication designator icon 306, central vertical axis icon 307, and expanding triangular icon 308 to user. Expanding triangular icon 308 indicates the progressive magnification set to increase with elevation. Central vertical axis icon 307 designates the center of magnification so that image segments (i.e., pixels) are magnified by moving those segments outward from the central vertical axis. Although central vertical axis icon 307 is shown oriented to provide a horizontal magnification or image expansion contrast thereat, other orientations and positions of the axis may be used to compensate for distortions in other directions.

LCD panel 303 may also display plumb line readout 309 which aids a user in determining if a camera is being held level and free of tilt. Plumb line readout 309 is responsive relative to a horizontal plane, i.e., tilt up/down and left/right.

Figure 4A:
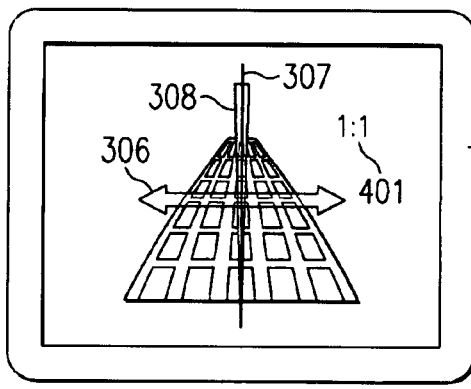
FIG. 4A shows the distorted image depicted on the LCD panel of FIG. 3 with graphics to aid a user in compensating for vertical distortion.
Figure 4B:
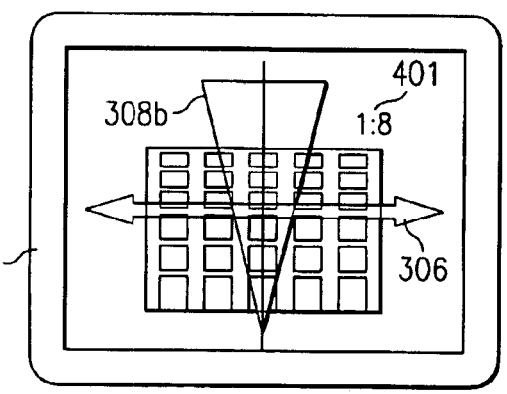
FIG. 4B shows the distorted image on the LCD panel of FIG. 4A with graphics to aid a user to proportionally adjust the horizontal magnification of the image to bring vertical lines into proper orientation.
Figure 4C:
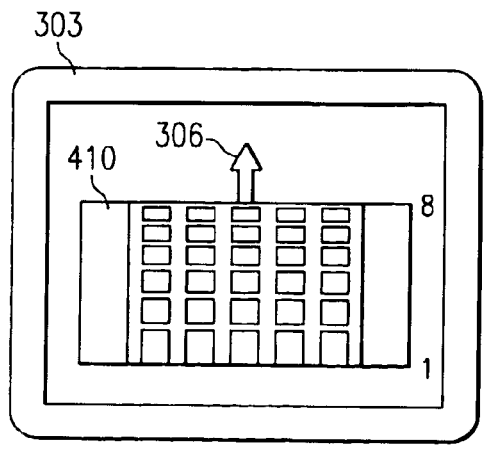
FIG. 4C depicts a distorted image and graphics to aid a user in compensating for compression in the vertical direction with a corresponding gray scale gradient indicating areas of proportional image compression.
Figure 4D:
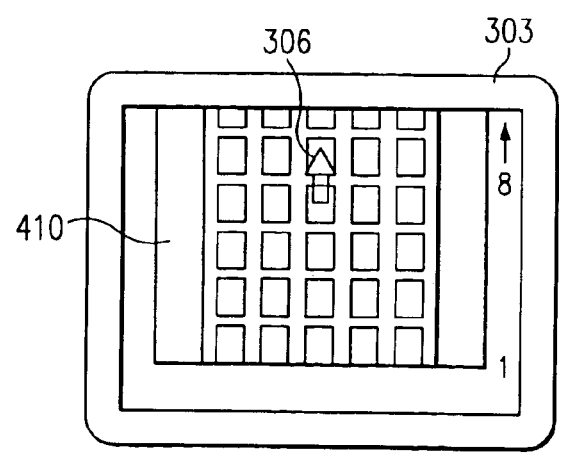
FIG. 4D depicts the image of FIG. 4C as it appears in the LCD panel after compensation for the distortion.

One use of LCD display 303 in digital camera 300 to correct distortion in an image is set forth in FIGS. 4A–4D. FIG. 4A depicts LCD display 303 having distorted image 305 and magnification direction indicator 306, central vertical axis icon 307 and triangular icon 308 thereon. LCD display 303 also displays expansion ratio 401, which is set at 1:1 for distorted image 305. Expansion ratio 401 represents the ratio between top and bottom of image 305 or triangular icon 308 area. FIG. 4B depicts imaged subject 305 after horizontal expansion to place converging verticals in proper orientation. As depicted in FIG. 4B, triangular icon 308b expands proportionately with the magnification of the image in the horizontal directions. Magnification indicator 401 depicts the expansion ratio after correction in the horizontal direction. As shown in FIG. 4C, LCD panel 303 then depicts shaded box 410 having a gradient gray scale indicating the relative compression of the image in the vertical direction. Magnification indicator icon 306 notifies the user of the direction in which to expand the image. As depicted in FIG. 4D, expansion of the image may cause the image to go off the top of the display, however, a corrected image is realized when the gray scale is uniform. A user may then scroll and capture that part of the image that the user is interested in, including the top of the building. Alternatively, the image may be resized to fit within the confines of the viewable image area of LCD panel 303.

Figure 5A:
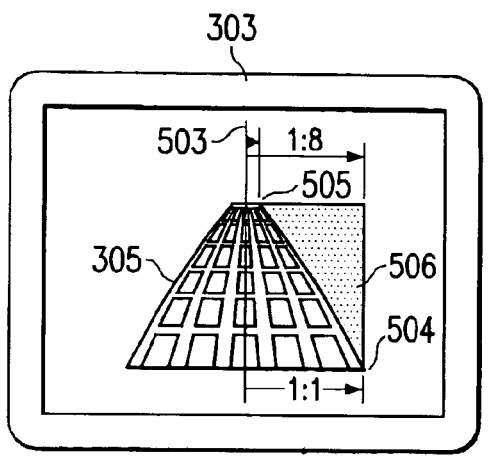
FIG. 5A depicts a distorted image with an alternative representation of the amount of distortion indicated by the gray triangular region.
Figure 5B:
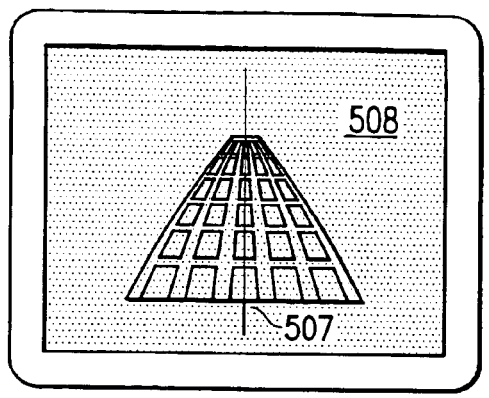
FIG. 5B shows the compression in the horizontal and vertical directions, represented by gray scale gradient, as computed in response to the dimensions of the gray triangular section of FIG. 5A.
Figure 5C:
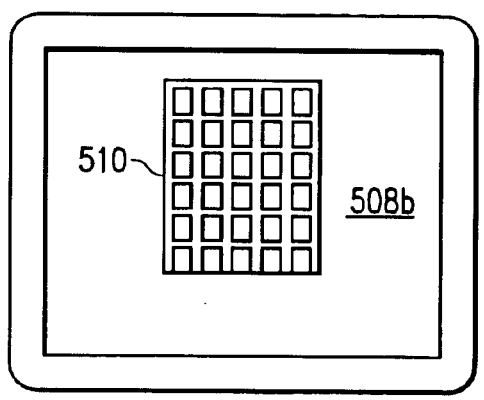
FIG. 5C shows the corrected image having uniform gray scaling which indicates proper correction in the horizontal and vertical directions.

An alternative method for correcting converging verticals is depicted in FIGS. 5A–5C. As shown in FIG. 5A, LCD panel 303 has distorted image 305 depicted thereon. According to this embodiment of the invention, central vertical axis 503 is generated or chosen by the user. Bottom vertical point 504 is also identified or selected. Likewise top vertical point 505 is identified or selected. Using these two points, the system then generates triangular shaded region 506 which is used to calculate the progressive magnification needed to correct the image. As shown in FIG. 5A, the distance from vertical line 503 to bottom vertical point 504 is assigned a ratio of one to one. The ratio to move point 505 from vertical axis 503 needed to correct vertical distortion is calculated, in this example the ratio is one to eight. As depicted in FIG. 5B, this information can be used to show distorted pixel density 508, which needs to be made uniform in order to correct the image. Origin 507 is the baseline for pixel density. As shown in FIG. 5C, movement of the image as indicated by the pixel density results in corrected image 510 as indicated by the uniform pixel shading 508B.

Figure 6:
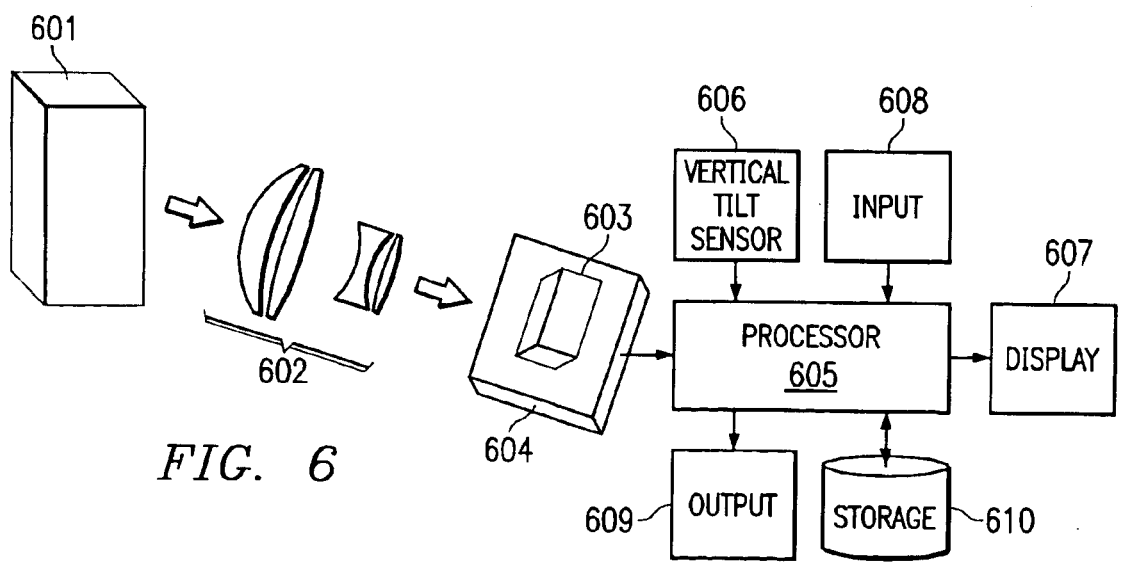
FIG. 6 is a block diagram of a device according to the invention that selectively detects and compensates for converging verticals.

As depicted in FIG. 6, in operation, light from subject 601 to be imaged passes through lens system 602 of an imaging device to form distorted image 603 on imaging surface 604. Distorted image 603 is sent to processor 605 for correction. In this embodiment, the device includes vertical tilt sensor 606 which allows a user to determine and possibly correct beforehand, the tilt of the camera. Alternatively, processor 605 may be responsive to camera tilt and distance to subject 601 to automatically correct for such distortion. According to this feature, distance to the subject may be obtained by the camera lens focusing system.

Image 603 may be viewed on display 607 by user. The user may use input 608 to correct distortion of image 603. The corrected image may then be sent to output 609, such as a personal computer. Or alternatively, corrected image may be compressed using, for example, a lossy compression algorithm such as JPEG and then sent to storage 610 which is preferably non-volatile storage contained in the device itself.

Given the foregoing, variations and modifications to the invention should now be apparent to a person having ordinary skill in the art. These variations and modifications are intended to fall within the scope and spirit of the invention as defined by the following claims.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art from the disclosure of the present invention, processes, machines, manufacture, compositions of matter, means, methods, or steps, presently existing or later to be developed that perform substantially the same function or achieve substantially the same result as a corresponding embodiment described herein may be utilized according to the present invention. Accordingly, the appended claims are intended to include within their scope such processes, machines, manufacture, compositions of matter, means, methods, or steps.

What is claimed is:

1. A digital camera comprising:
   an image sensor providing a digital representation of an optical image to be captured; and
   a processor configured to selectively process said digital representation of said optical image to compensate for a linear convergence distortion of said optical image; and
   wherein said processor is configured to progressively magnify, in two-dimensions, said digital representation so as to reduce apparent linear convergence, wherein said processor is configured to determine a linear distortion value relative to a baseline, and wherein said processor is configured to determine said linear distortion value in response to identification of an offset from vertical of a line segment identified in said optical image.

2. The digital camera according to claim 1 wherein said processor is configured to apply a varying magnification factor to said digital representation of said optical image along a first axis with respect to a second axis orthogonal to said first axis.

3. The digital camera according to claim 2 wherein said first and second axes correspond to a plane defined by an imaging surface of said image sensor on which said optical image is formed.

4. The digital camera according to claim 2 further comprising:
   an input device configured to provide manual control of said magnification factor.

5. The digital camera according to claim 4 further comprising:
   a display for displaying said optical image before and after processing by said processor.

6. The digital camera according to claim 1 wherein said processor is configured to apply a variable aspect ratio to said optical image to compensate for said linear convergence distortion of said optical image as formed on said image sensor.

7. The digital camera according to claim 6 wherein said linear distortion is caused by an orientation of an imaging surface of said image sensor with respect to a subject corresponding to at least a portion of said optical image.

8. A digital camera comprising:
   an image sensor providing a digital representation of an optical image to be captured; and
   a processor configured to selectively process said digital representation of said optical image to compensate for a linear convergence distortion of said optical image; and
   wherein said processor is configured to progressively magnify, in two-dimensions, said digital representation so as to reduce apparent linear convergence, wherein said processor is configured to determine a linear distortion value relative to a baseline, and wherein said processor is configured to determine said linear distortion value in response to identification of a difference in length between two line segments identified in said optical image.

9. The digital camera according to claim 8 wherein said processor is configured to apply a varying magnification factor to said digital representation of said optical image along a first axis with respect to a second axis orthogonal to said first axis.

10. The digital camera according to claim 9 wherein said first and second axes correspond to a plane defined by an imaging surface of said image sensor on which said optical image is formed.

11. The digital camera according to claim 9 further comprising:
    an input device configured to provide manual control of said magnification factor.

12. The digital camera according to claim 11 further comprising:
    a display for displaying said optical image before and after processing by said processor.

13. The digital camera according to claim 8 wherein said processor is configured to apply a variable aspect ratio to said optical image to compensate for said linear convergence distortion of said optical image as formed on said image sensor.

14. The digital camera according to claim 13 wherein said linear distortion is caused by an orientation of an imaging surface of said image sensor with respect to a subject corresponding to at least a portion of said optical image.

* * * * *